(12) United States Patent
Cao et al.

(10) Patent No.: US 11,683,317 B2
(45) Date of Patent: Jun. 20, 2023

(54) BEHAVIOR MANAGEMENT

(71) Applicant: International Business Machines Corporation, Armonk, NY (US)

(72) Inventors: Li Cao, Beijing (CN); Ze Ming Zhao, Beijing (CN); Qing Li, Beijing (CN); Yi Shan Jiang, Beijing (CN); Cheng Fang Wang, Shangdi (CN)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 17/032,010

(22) Filed: Sep. 25, 2020

(65) Prior Publication Data

US 2022/0103561 A1 Mar. 31, 2022

(51) Int. Cl.
*H04L 9/40* (2022.01)
*G06N 20/00* (2019.01)
*G06Q 20/32* (2012.01)
*G06Q 40/02* (2023.01)
*G06Q 20/10* (2012.01)
*G06Q 20/12* (2012.01)
*G06Q 20/40* (2012.01)

(52) U.S. Cl.
CPC .......... *H04L 63/102* (2013.01); *G06N 20/00* (2019.01); *H04L 63/104* (2013.01); *H04L 63/108* (2013.01); *G06Q 20/108* (2013.01); *G06Q 20/127* (2013.01); *G06Q 20/3223* (2013.01); *G06Q 20/4037* (2013.01); *G06Q 40/02* (2013.01)

(58) Field of Classification Search
CPC ... H04L 63/102; H04L 63/104; H04L 63/108; H04L 63/08; H04L 63/105; H04L 63/20; G06N 20/00; G06Q 20/108; G06Q 20/127; G06Q 20/3223; G06Q 20/4037; G06Q 40/02; G06F 21/604; G06F 21/316
See application file for complete search history.

(56) References Cited

U.S. PATENT DOCUMENTS 9,710,852 B1 7/2017 Olson
9,870,589 B1 1/2018 Arnold
(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

*Primary Examiner* — Khoi V Le
(74) *Attorney, Agent, or Firm* — Haley J. McClory

(57) ABSTRACT

Embodiments of the present invention relate to methods, systems, and computer program products for user behavior management. In embodiments, a group of states of a user of an application system within a previous time period may be obtained. A state in the group of states may be associated with a privilege of the user for accessing resources in the application system during the previous time period. A feature of the user may be generated based on the group of states. A privilege of the user at a current time may be managed in the application system based on the feature. With these embodiments, the user behavior may be managed according to various aspect of the user's historical states and thus the user may be managed in a more accurate and effective manner.

18 Claims, 11 Drawing Sheets

(56) References Cited

U.S. PATENT DOCUMENTS

| | | | |
|---|---|---|---|
| 10,938,828 B1* | 3/2021 | Badawy | H04L 63/105 |
| 2002/0129135 A1* | 9/2002 | Delany | H04L 67/564 |
| | | | 707/E17.005 |
| 2002/0156879 A1* | 10/2002 | Delany | H04L 63/102 |
| | | | 709/229 |
| 2002/0166049 A1* | 11/2002 | Sinn | G06F 21/6218 |
| | | | 713/175 |
| 2003/0009694 A1* | 1/2003 | Wenocur | H04L 63/04 |
| | | | 713/176 |
| 2014/0365356 A1 | 12/2014 | Gao | |
| 2018/0246992 A1 | 8/2018 | Bu | |

* cited by examiner

BEHAVIOR MANAGEMENT

BACKGROUND

The present invention relates to user management. More particularly, the present invention relates to computer-implemented methods, computer-implemented systems and computer program products for managing user behavior.

With developments of machine learning technology, behaviors of a user in an application system may be monitored and managed based on machine learning models. For example, a current state of the user may be collected to generate a portrait, such that user behaviors for accessing resources in the application system may be managed based on the portrait. However, the state of the user may change over time and the generated portrait cannot accurately reflect an overall situation of the user. Therefore, how to manage the user behavior in the application systems effectively becomes an important focus.

SUMMARY

According to one embodiment of the present invention, a computer-implemented method for user behavior management is provided. The computer-implemented method includes obtaining a group of states from a user of an application system within a previous time period, in which a state in the group of states is associated with a privilege of the user for accessing resources in the application system during the previous time period. The computer-implemented method further includes generating a feature of the user based on the group of states. The method further includes managing the privilege of the user at a current time in the application system based on the feature.

According to another embodiment of the present invention, a computer system for user behavior management is provided. The computer system includes one or more computer processors coupled to one or more computer-readable storage media, and computer program instructions stored on the one or more computer readable storage media for execution by the one or more computer processors. The computer program instructions include instructions to obtain a group of states from a user of an application system within a previous time period, in which a state in the group of states is associated with a privilege of the user for accessing resources in the application system during the previous time period. The computer program instructions further include instructions to generate a feature of the user based on the group of states. The computer program instructions further include instructions to manage a privilege of the user at a current time in the application system based on the feature.

According to another embodiment of the present invention, there is provided a computer program product. The computer program product comprises one or more computer readable storage media having program instructions stored therein. The computer program instructions include instructions to obtain a group of states from a user of an application system within a previous time period, in which a state in the group of states is associated with a privilege of the user for accessing resources in the application system during the previous time period. The computer program instructions further include instructions to generate a feature of the user based on the group of states. The computer program instructions further include instructions to manage a privilege of the user at a current time in the application system based on the feature.

BRIEF DESCRIPTION OF THE DRAWINGS

The drawings included in the present invention are incorporated into, and form part of, the specification. They illustrate embodiments of the present invention and, along with the description, serve to explain the principles of the disclosure. The drawings are only illustrative of certain embodiments and do not limit the disclosure.

DETAILED DESCRIPTION

Figure 1:
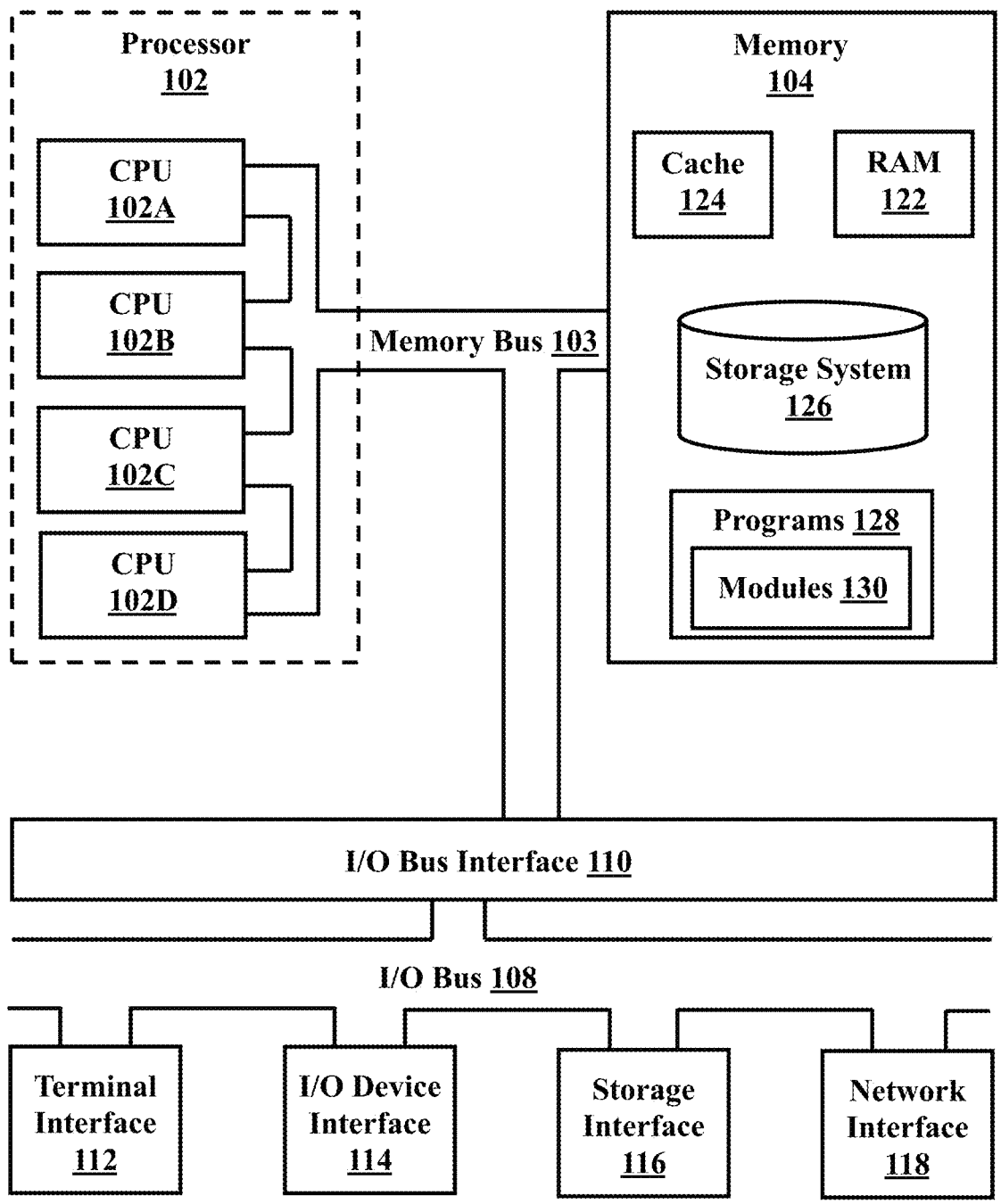
FIG. 1 illustrates a high-level block diagram of an example computer system that may be used in implementing one or more of the methods, tools, and modules, and any related functions, described herein, in accordance with embodiments of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 1 illustrates a high-level block diagram of an example computer system 101 that may be used in implementing one or more of the methods, tools, and modules, and any related functions, described herein (e.g., using one or more processor circuits or computer processors of the computer), in accordance with embodiments of the present invention. In some embodiments, the major components of the computer system 101 may comprise one or more processors 102, a memory subsystem 104, a terminal interface 112, a storage interface 116, an I/O (Input/Output) device interface 114, and a network interface 118, all of which may be communicatively coupled, directly or indirectly, for inter-component communication via a memory bus 103, an I/O bus 108, and an I/O bus interface unit 110.

The computer system 101 may contain one or more general-purpose programmable central processing units (CPUs) 102A, 102B, 102C, and 102D, herein generically referred to as the CPU 102. In some embodiments, the computer system 101 may contain multiple processors typical of a relatively large system; however, in other embodiments the computer system 101 may alternatively be a single CPU system. Each CPU 102 may execute instructions stored in the memory subsystem 104 and may include one or more levels of on-board cache.

System memory 104 may include computer system readable media in the form of volatile memory, such as random access memory (RAM) 122 or cache memory 124. Computer system 101 may further include other removable/non-removable, volatile/non-volatile computer system storage media. By way of example only, storage system 126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 104 can include flash memory, e.g., a flash memory stick drive or a flash drive. Memory devices can be connected to memory bus 103 by one or more data media interfaces. The memory 104 may include at least one program product having a set (e.g., at least one) of program modules that are configured to carry out the functions of various embodiments.

One or more programs/utilities 128, each having at least one set of program modules 130 may be stored in memory 104. The programs/utilities 128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 128 and/or program modules 130 generally perform the functions or methodologies of various embodiments.

Although the memory bus 103 is shown in FIG. 1 as a single bus structure providing a direct communication path among the CPUs 102, the memory subsystem 104, and the I/O bus interface 110, the memory bus 103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 110 and the I/O bus 108 are shown as single respective units, the computer system 101 may, in some embodiments, contain multiple I/O bus interface units 110, multiple I/O buses 108, or both. Further, while multiple I/O interface units are shown, which separate the I/O bus 108 from various communications paths running to the various I/O devices, in other embodiments some or all of the I/O devices may be connected directly to one or more system I/O buses.

In some embodiments, the computer system 101 may be a multi-user mainframe computer system, a single-user system, or a server computer or similar device that has little or no direct user interface, but receives requests from other computer systems (clients). Further, in some embodiments, the computer system 101 may be implemented as a desktop computer, portable computer, laptop or notebook computer, tablet computer, pocket computer, telephone, smartphone, network switches or routers, or any other appropriate type of electronic device.

It is noted that FIG. 1 is intended to depict the representative major components of an example computer system 101. In some embodiments, however, individual components may have greater or lesser complexity than as represented in FIG. 1, components other than or in addition to those shown in FIG. 1 may be present, and the number, type, and configuration of such components may vary.

Figure 2:
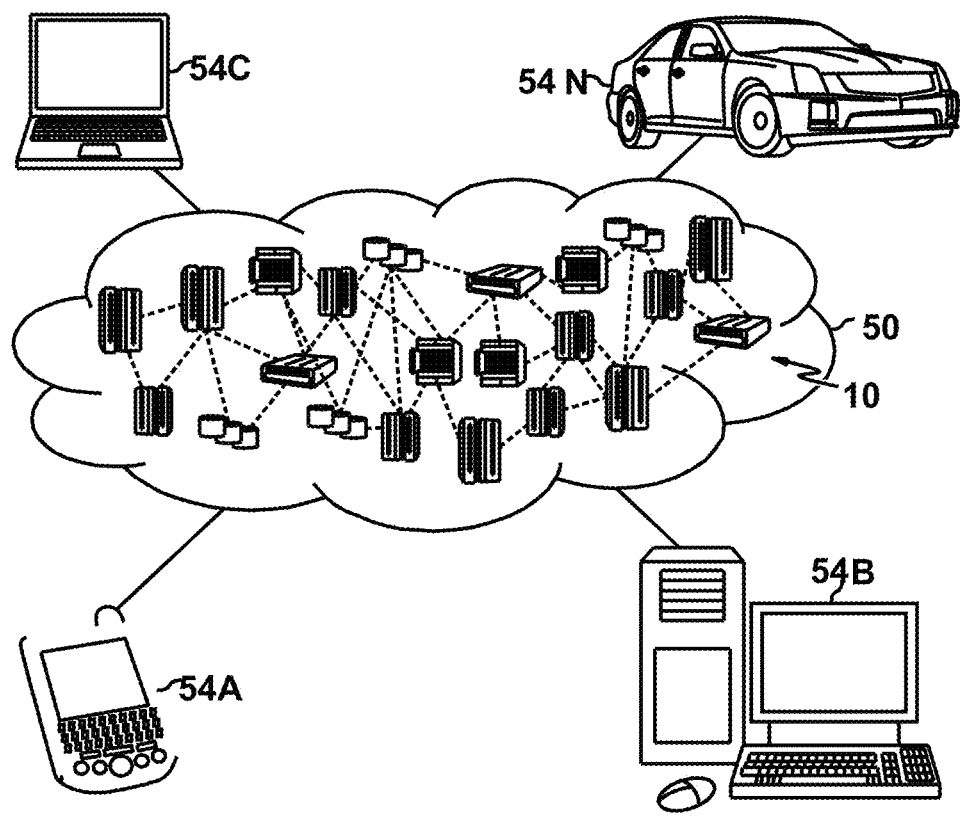
FIG. 2 illustrates a cloud computing environment, in accordance with embodiments of the present invention.

Referring now to FIG. 2, a block diagram depicting a cloud computing environment 50 is depicted in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
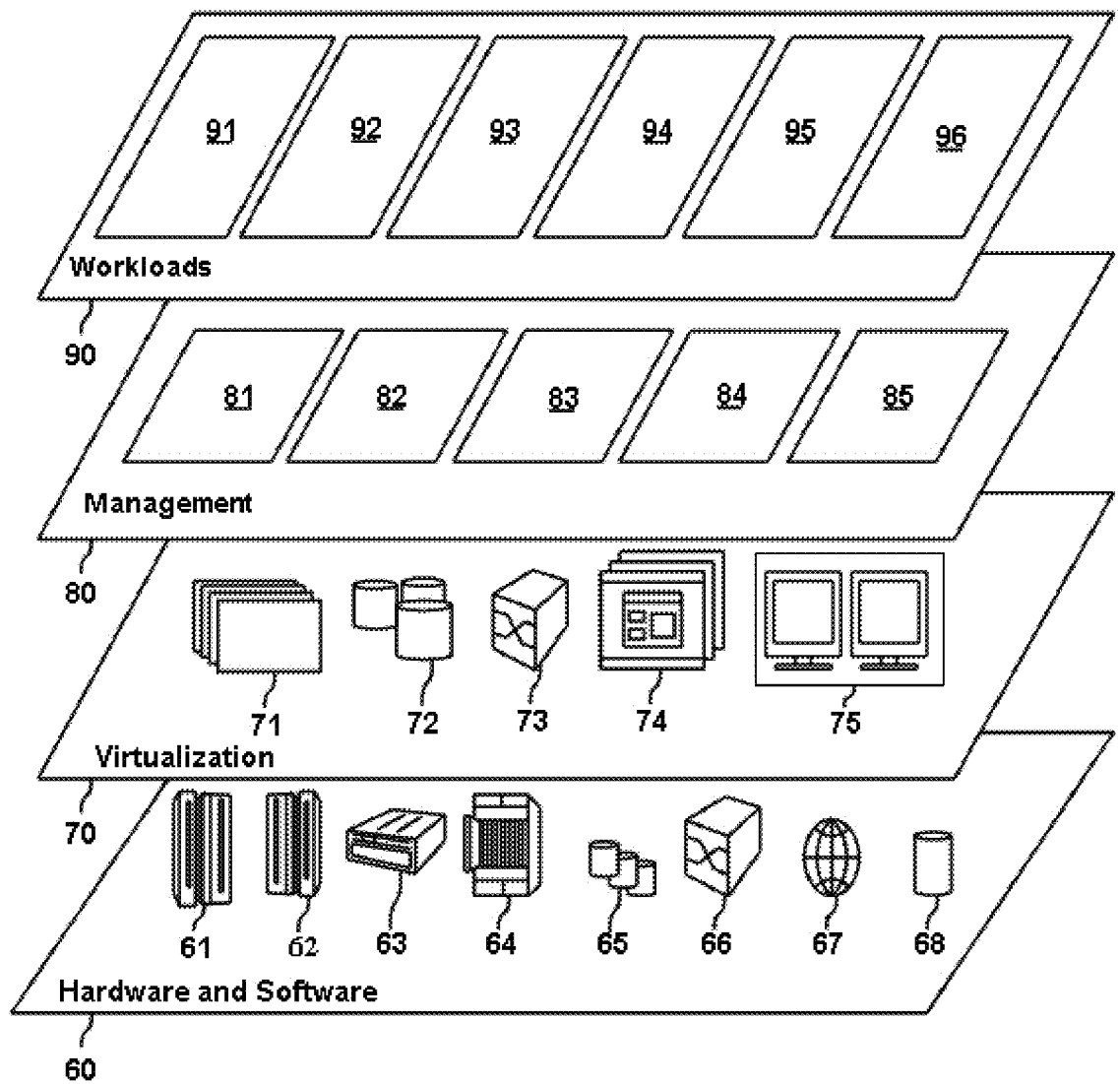
FIG. 3 illustrates abstraction model layers, in accordance with embodiments of the present invention.

Referring now to FIG. 3, is block diagram depicting a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user behavior management 96.

It should be noted that the user behavior management 96, according to embodiments of the present invention, could be implemented by computer system 101 of FIG. 1. A working environment of the present invention is disclosed herein. For the sake of clarity, embodiments of the present invention will be disclosed using a telecommunication system as an example application system, though any system capable of using the methods described herein could be used. Telecommunication systems can have millions of users where a user can be identified by his/her cell phone number keyed to a telecommunication device used in the telecommunication system. Using the telecommunication device, the user may deposit a certain amount of money into his/her account and then the account balance may be charged for communication services.

If a state of the user is normal, the user may have normal privileges and may be allowed to access all resources provided by the telecommunication system. For example, the user can make phone calls, answer phone calls, send and receive messages, enjoy data services, and the like. However, when the balance of money is lower than a threshold amount, the user can be prevented from accessing some of the resources (e.g., privileges). For example, if the user's balance is below a threshold amount the user could be prevented from making phone calls, but in some circumstances could be allowed to answer phone calls on the telecommunication device.

Some embodiments include determining a user's privilege based on a current state of the user, such as the user's history associated with payment, prior money balance or credit score. In embodiments, a user's reputation and/or prior history (i.e., current state) could be leveraged to determine proper privileges when a balance falls below a threshold amount. For example, a user who is determined to be reputable by the system, but who has forgotten to pay the bill by accident could have their balance fall below the threshold amount. In this example, without the user's reputation/history, the telecommunication system may stop service (i.e., reduce privileges) and the user may be faced with a bad experience (i.e., loss of resources at a critical moment), but if the user's reputation is considered, the user could maintain consistent privileges despite their balance falling below the threshold.

In some embodiments, although the balance may be above the threshold amount, an unauthorized user may act maliciously and make fraudulent international phone calls using the authorized user's phone number and cause a financial loss to the telecommunication company. Accordingly, the current state cannot clearly reflect the overall situation of the user, and thus sometimes the privilege may be managed in incorrectly.

Figure 4:
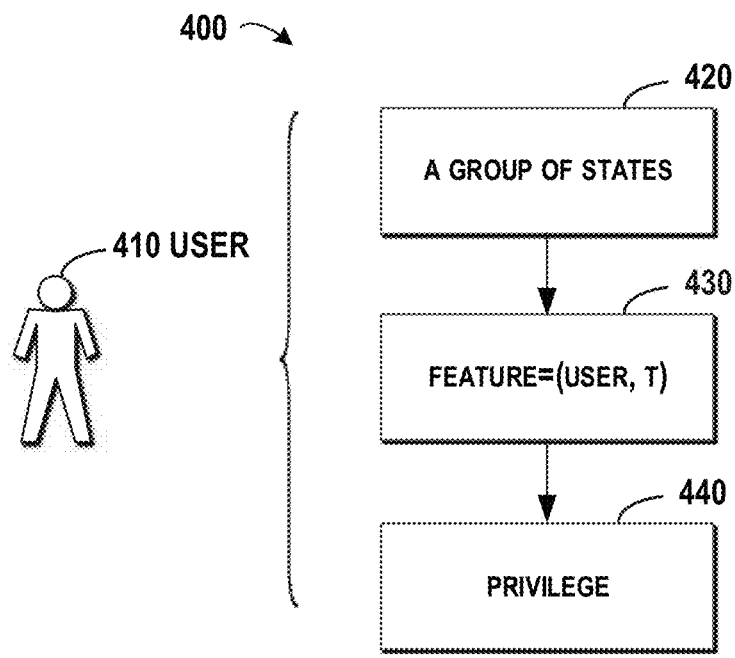
FIG. 4 is a flow chart diagram depicting operational steps for managing user behavior in an application system, in accordance with at least one embodiment of the present invention.

In view of the above drawbacks, embodiments of the present invention provide solutions for managing user behaviors based on a group of historical states of the user. Reference will be made to FIG. 4 for a brief description of an embodiment of the present invention. FIG. 4 depicts a block diagram 400 of a procedure for managing a user in an application system according to an embodiment of the present invention. In FIG. 4, a group of states 420 can include historical states of a user 410 for a previous time period. A state in the group of states 420 can be associated with a privilege of the user 410 for accessing resources in the application system during the previous time period. The group of states 420 may relate to various privilege types, in which some may relate to a normal privilege type where the user 410 may access all the resources in the application system, and some of them may relate to an abnormal privilege type where the user 420 may access only a portion of the resources.

In embodiments, a feature 430 may be generated for the user 410 based on the group of states 420. In these embodiments, the feature 430 may be associated with the user 410 and time. In other words, the feature 430 is based on multiple previous time slices in a previous time period (for example, the last 12 months before the current time) and thus may represent various aspects of the user's historical situation. Next, the privilege 440 for the current time may be managed for the user 410 based on the feature 430.

In embodiments, the feature 430 may reflect dynamic information collected during the previous time period, and thus the user's situation may be represented in a more precise and effective manner. This can allow the user behavior to be managed more accurately. For example, if the group of states 420 show that the user 410 is reputable, even if his/her balance is temporarily below the threshold, the user 410 may be given a normal privilege and allowed to continue to access the resources. Alternatively, if the group of states 420 indicate a bad reputation, the user 410 may be given a limited privilege even if the balance is above the threshold. Therefore, the user's situation may be measured based on his/her historical states, such that errors in behavior managements caused by relying on only current states (e.g., balance is above/below threshold amount) may be reduced or eliminated.

Figure 5:
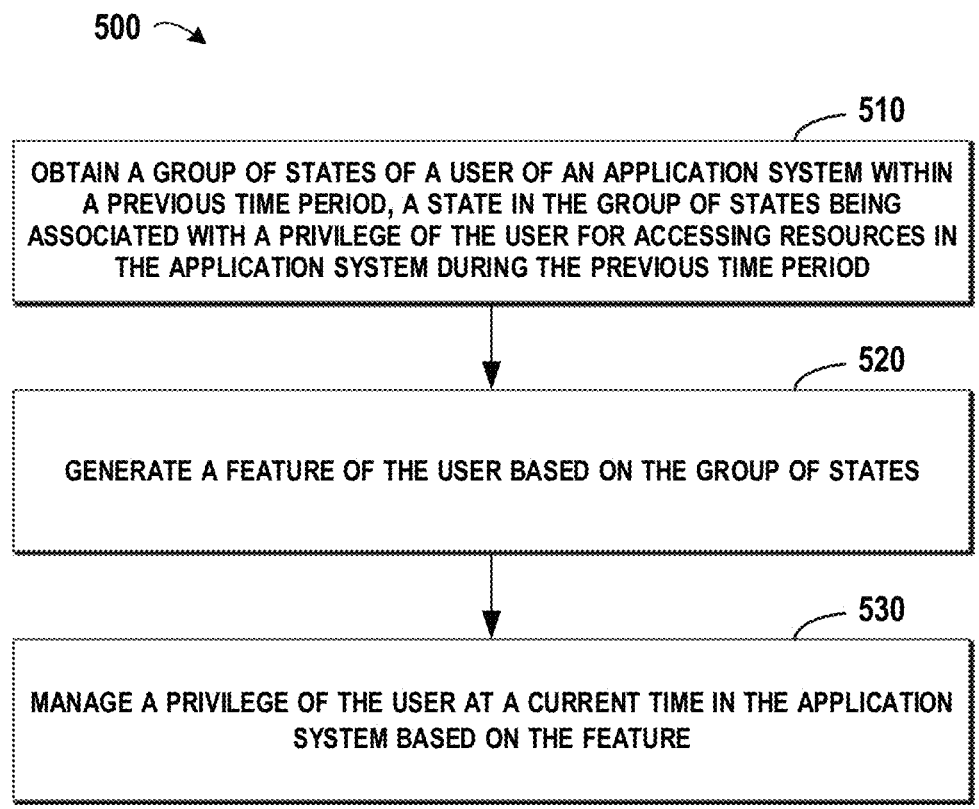
FIG. 5 is a flow chart diagram depicting operational steps for managing user behavior in an application system, in accordance with at least one embodiment of the present invention.

Reference will be made to FIG. 5 for more details about the user management. FIG. 5 depicts a flowchart of a method 500 for managing a user in an application system according to an embodiment of the present invention. At a block 510, a group of states (i.e., group of states 420) of the user (i.e., user 410) of an application system within a previous time period are obtained, and each state in the group of states 420 is associated with a separate privilege of the user for accessing resources in the application system during the previous time period. It is to be understood that the group of states may comprise multiple types such as any of a normal type and an abnormal type. In the normal type, the user is allowed to access all resources in the application system; while in the abnormal type, the user is allowed to access only a portion of the resources.

Figure 6:
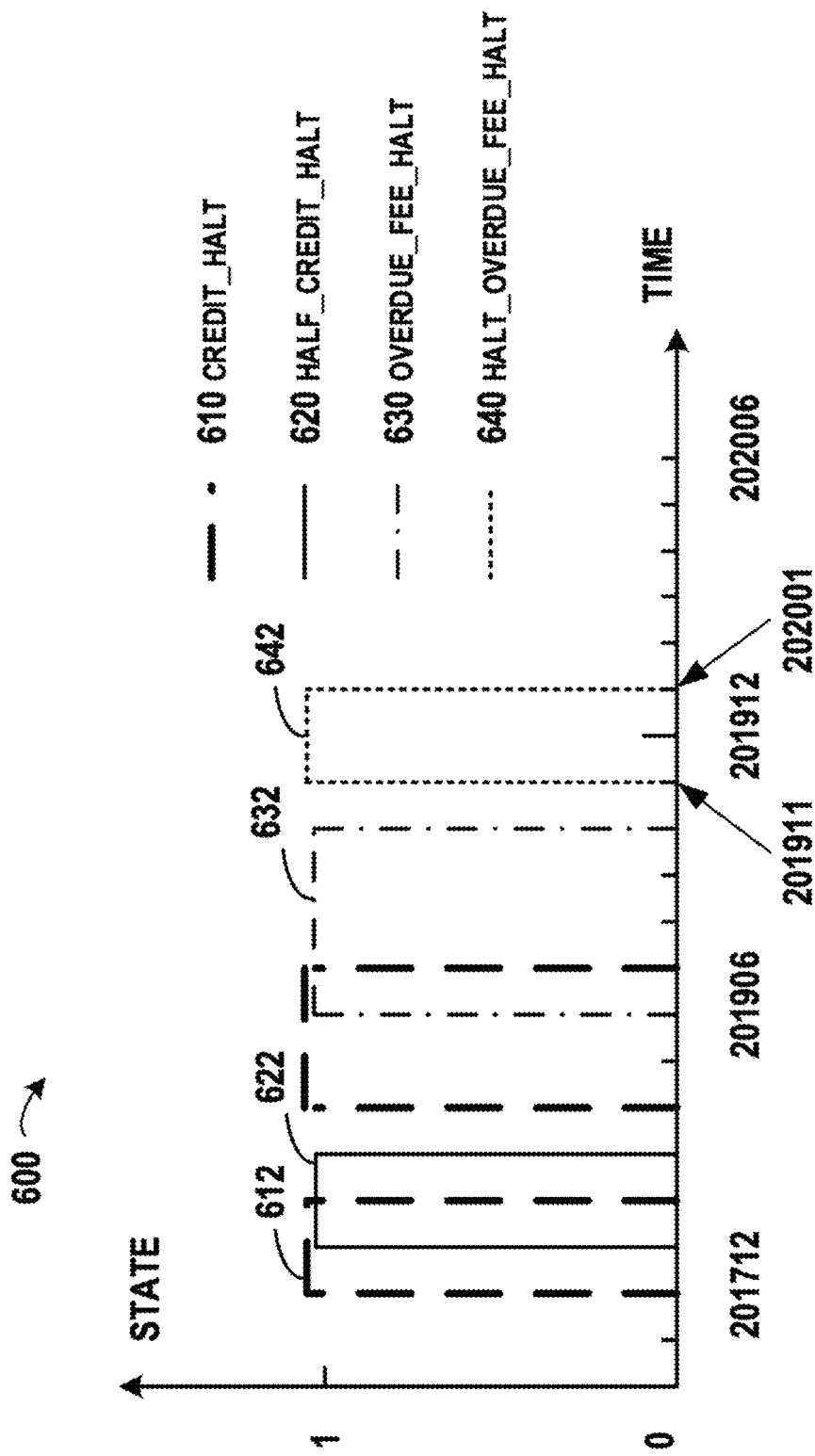
FIG. 6 depicts a group of states of a user in an application system, according to an embodiment of the present invention.

In embodiments, the abnormal types may comprise any of a credit abnormal type and/or an overdue abnormal type. FIG. 6 depicts an example embodiment regarding the details of the abnormal types. More particularly, FIG. 6 depicts a group of states associated with a user in an application system according to at least one embodiment of the present invention. In FIG. 6, the horizontal axis indicates time and the vertical axis indicates a state. For example, "state=1" may represent an abnormal state where at least some services are stopped and the user can only access a portion of the resources (i.e., privileges) in the application system; and "state=0" may represent a normal state where the user can access all the resources.

In embodiments, a state can have a serious level. The serious level can have a halt state that may comprise: a half halt state where the user can access some of the resources (e.g., the user 410 can answer phone calls but cannot make phone calls), and a halt state where the user cannot access any resources (e.g., the user 410 cannot make or answer phone calls). Further, according to reasons for stopping the service, the halt state may comprise a credit abnormal type and/or an overdue abnormal type. In FIG. 6, the group of states (i.e., group of states 420) may include four types: a CREDIT_HALT type 610, where the user cannot access any resources due to his/her credit being below a first threshold credit; a HALF_CREDIT_HALT type 620, where the user can access a portion of the resources due to his/her credit being below a second threshold credit; an OVERDUE_HALT type 630, where the user cannot access any resources due to his/her balance being below a first threshold balance; and a HALF_OVERDUE_HALT type 640, where the user can access a portion of resources due to his/her balance being below a second threshold balance.

In the example embodiment depicted in FIG. 6, data points 612, 622, 632 and 642 represent abnormal states with the above four types that occurred in the previous time period (i.e., CREDIT_HALT type, HALF_CREDIT_HALT type, OVERDUE_HALT type, and HALF_OVERDUE_HALT type). In some embodiments, the shape of the curve can represent the time duration the abnormal state occurred. For example, the data point 642 can represent that the state with the HALF_OVERDUE_HALT type 640 occurred during November 2019 to January 2020. In some embodiments, the length of the previous time period may be defined in advance. For example, in FIG. 6 the current time is June 2020 and the previous time period can cover the last 18 months. In other embodiments, the previous time period may refer to a different duration/length of time. The longer the length of the time period is set to, the more the user will be impacted by his/her historical behaviors. In these embodiments, the group of states (i.e., group of states 420) are classified into multiple types and thus historical user states may be measured according to various aspects. Therefore, the privilege of the current time may be determined in a more reliable and effective manner.

Having described details about the group of states, reference will be made back to FIG. 5 for generating a feature 430 for the user 410. At block 520 in FIG. 5, the feature 430 may be generated based on the group of states 420. In embodiments, the group of states 420 may be analyzed one by one. Particularly, states may be analyzed with respect to multiple attributes, such as how many states are included in the group of states 420, a time duration of a state, and the time difference related to the state.

In some embodiments, a count of states represents how many states are included in the group of states. For example, the count may indicate a total number of all the states. Alternatively, and/or in addition to, the count may also indicate a number of states with a given type. According to an embodiment of the present invention, the feature 430 may include multiple dimensions, and each dimension of the feature 430 may be determined based on one of the herein discussed attributes, and each dimension of the state may correspond to an attribute of the feature 430. With the above embodiment, the state may be measured in a more accurate way and thus provide more information about the state in generating the feature 430.

Figure 7:
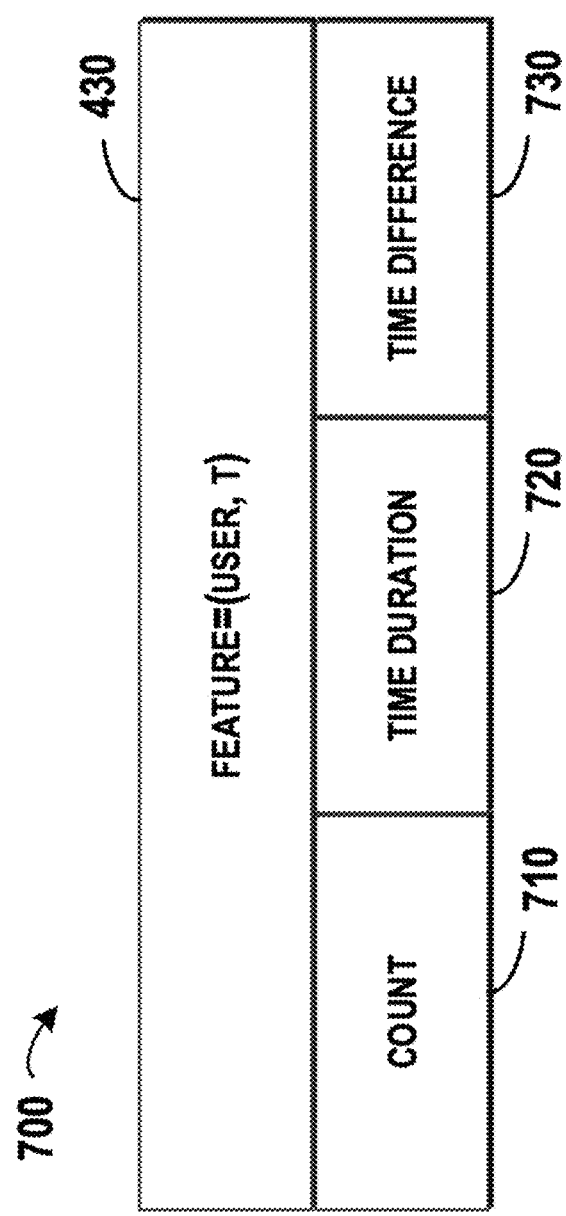
FIG. 7 is a block diagram depicting an example data structure of a feature of a user, in accordance with at least one embodiment of the present invention.

FIG. 7 depicts a block diagram 700 of a data structure associated with a feature of a user in accordance with at least one embodiment of the present invention. In FIG. 7, the feature 430 may comprise a count 710 dimension, a time duration 720 dimension and a time difference 730 dimension. Each of the aforementioned dimensions can be determined by a variety of methods. In some embodiments, a feature component of the dimension may be generated for each type, and thus the count dimension 710 may include four feature components corresponding to the above four halt types 610, 620, 630 and 640.

In embodiments, in order to determine a feature component for a given abnormal type, a portion of states having the given abnormal type may be selected from the group of states 420. In these embodiments, the feature component may then be generated based on a comparison of the portion of states and the group of states 420. A feature component related to the count 710 dimension may be determined for each of the above halt types 610, 620, 630 and 640. Particularly, the following Formula (1) may be used for determining a feature component related to the count 710 dimension for a type.

$$\text{feature\_count}_{type}(user, t) = \frac{\sum_{i=t, start\_time_{type}(halt_{user}) \in i}^{t-m} count_{type}(halt_{user})}{\sum_{i=t, start\_time_{all\_type}(halt_{user}) \in i}^{t-m} count_{type}(halt_{user})} \quad \text{Formula (1)}$$

Where feature_count$_{type}$ can represent a feature component related to the count 710 dimension for a type of the state (represented by type), feature_count$_{type}$ (user, t) can represent a function depending on an identification of the user (represented by user) and/or a current time (represented by t), m can represent a length of the previous time period, halt$_{user}$ can represent a halt state of the user, start_time$_{type}$ can represent a start time of the halt state, start_time$_{type}$(halt$_{user}$)∈i can represent a halt state within the previous time period, count$_{type}$ represents a count of states with the type, and all_type can represent the four types referenced herein. In other words, the above Formula (1) indicates that the feature component for the count 710 dimension is determined based on a comparison of a count of states with a given type and a count of states of all the types.

In at least one embodiment, if the group of states 420 includes 4 states, among which one state has the CREDIT_HALT type 610, the feature component related to the count 710 dimension for the CREDIT_HALT type 610 may be determined as ¼. It is to be understood that the above Formula (1) is just one possible method for determining the feature component, but the feature component may be determined based on another formula. For example, the feature component may be determined based on the value of the numerator in Formula (1).

In some embodiments, in Formula (1), the type may relate to any of the above four types. As a result, the feature component for another type may be determined in a similar manner In these embodiments, the feature component related to the count 710 dimension may be determined in a simple manner for each of the above types. Accordingly, the feature 430 may include rich information about the historical states, such that the privilege 440 of the current time may be determined in an accurate manner.

In some embodiments, the feature 430 may further comprise a time duration 720 dimension. Particularly, the following formula (2) may be used for determining a feature component related to the time duration 720 dimension.

$$\text{feature\_duration}_{type}(user, t) = \frac{\sum_{i=t, start\_time_{type}(halt_{user}) \in i}^{t-m} (\text{end\_time}_{type}(halt_{user}) - \text{start\_time}_{type}(halt_{user}))}{\sum_{i=t, start\_time_{all\_type}(halt_{user}) \in i}^{t-m} (\text{end\_time}_{type}(halt_{user}) - \text{start\_time}_{type}(halt_{user}))} \quad \text{Formula (2)}$$

In embodiments, feature_duration$_{type}$ can represent a feature component related to the time duration 720 dimension for a type of the state (represented by type), feature_duration$_{type}$(user,t) can represent a function depending on an identification of the user (represented by user) and/or a current time (represented by t), m can represent a length of the previous time period, halt$_{user}$ can represent a halt state of the user, start_time$_{type}$ can represent a start time of the halt state, end_time$_{type}$ can represent an end time of the halt state, start_time$_{type}$(halt$_{user}$)∈i can represent a halt state within the previous time period, and all_type can represent the herein discussed four types. In other words, the above Formula (2) indicates that the feature component for the time duration 720 dimension can be determined based on a comparison of a sum of time duration for states with a given type and a sum of time duration for states of all the types.

In one example, the group of states 420 could include four states where the time durations of each the four states are 1, 2, 1, 2 months, respectively, and where one of the four states in identified as a CREDIT_HALT type 610 and a time duration of 1 month. Continuing this example, the feature component related to the time duration 720 dimension for the CREDIT_HALT type 610 may be determined by $1/(1+2+1+2) = 1/6$. It should be understood that Formula (2) is an example for determining the feature component, but the feature component may be determined based on another formula. For example, the feature component may be determined based on the value of the numerator in Formula (2).

In some embodiments, the type in Formula (2) may relate to any of the above four types, the feature component for another type may be determined in a similar manner In these embodiments, the feature component, related to the time duration 720 dimension, may be determined in a simple manner for each of the above types. Accordingly, the feature 430 may include rich information about the historical state, such that the privilege 440 of the current time may be determined in an accurate manner.

According to an embodiment of the present invention, the feature 430 may further include a time difference 730 dimension. The time difference 730 can represent a difference between a particular time occurrence of a state in the group of states 420 and a current time. A feature component can be related to the time difference 730 dimension and may be determined for each type. Particularly, formula (3) may be used for determining a feature component related to the time difference 730 dimension for a type.

$$\text{feature\_difference}_{type}(user, t) = \text{current\_time}_t - \text{latest}_t(\text{start\_time}_{type}(\text{halt}_{user})) \quad \text{Formula (3)}$$

In embodiments, where $\text{feature\_difference}_{type}$ can represent a feature component related to the time difference 730 dimension for a type of the state (represented by type), $\text{feature\_difference}_{type}$ (user, t) can represent a function depending on an identification of the user (represented by user) and/or a current time (represented by t), m can represent a length of the previous time period, $\text{halt}_{user}$ can represent a halt state related to the user, $\text{current\_time}_t$ can represent a current time point, $\text{start\_time}_{type}$ can represent a start time of the halt state, and $\text{latest}_t(\text{start\_time}_{type}(\text{halt}_{user}))$ can represent a latest occurrence of a halt state with the type. In other words, Formula (3) indicates that the feature component for the time difference 730 dimension can be determined based on a comparison of the current time and the latest occurrence (e.g., a particular time) of the state with the type.

In one example, the group of states 420 can include four states where two of the four states have the CREDIT_HALT type 610, with one of the two states occurring two months ago and the other of the two states occurring three months ago. Continuing this example, the feature component, related to the time difference 730 dimension for the CREDIT_HALT type, may be identified as occurring two months ago. It is to be understood that Formula (3) is an example for determining the feature component, but the feature component may be determined based on another formula. For example, the feature component may be determined based on an average of occurrences of the states with the type.

In some embodiments, the type in Formula (3) may relate to any of the above four types. As a result, the feature component for another type may be determined in a similar manner and details may be omitted hereinafter. In these embodiments, the feature component for the time difference 730 dimension may be determined in a simple manner for each of the above types. Accordingly, the feature 430 may comprise rich information about the historical state, such that the privilege 440 of the current time may be determined in an accurate manner.

According to an embodiment of the present invention, the dimension of the feature 430 may be determined based on the above feature components calculated for all the four types. In addition, feature 430 may be determined based on some or all of the dimensions as referenced in FIG. 7. As a result, feature 430 may include various aspects of the states and provide a foundation of accuracy for determining the privilege 440 for the user 410 at a particular and/or current time.

In some embodiments, states that occurred a long time ago can have less of an impact on the current situation of the user, and states that occurred more recently (e.g., current states) can have more impact on the current situation. In some embodiments, an attenuation function may be obtained for each state in the group of states 420. In these embodiments, the attenuation function can represent a degree of impact regarding how much that particular state impacts the privilege 440 of the user at the current time. This can be based on a time difference between an occurrence of the state and the current time. In these embodiments, the attenuation function may be determined based on an exponential function in Formula (4):

$$N(t) = N_0 e^{-a(t+l)} \quad \text{Formula (4)}$$

In embodiments, N can represent the attenuation function associated with the current time t, $N_0$ can represent an initial value predefined in advance, a and l can also be predefined values for controlling a shape of the attenuation function. In some embodiments, the attenuation function can demonstrate a downtrend. As a result, the farther the state is from the current time, the stronger the attenuation can be (e.g., the smaller the impact is).

It is to be understood that the above Formula (4) is just one method of determining an attenuation function, but the attenuation function may be determined based on another formula. In some embodiments, a linear function falling from an initial value to zero across the previous time period can be used. In these embodiments, the group of states 420 may be attenuated by the attenuation function. While this can result in states, occurring in the past (e.g., long before the current state), contributing less or, in some instances, even being removed during the feature generation, other states, that have occurred more recently (e.g., closer in time to the current state) may contribute more significantly in the feature generation. As such, the states occurring at different time points may be given different weights in generating the feature 430. Because of this, the feature 430 may reflect the historical user behavior more preciously.

Figure 8:
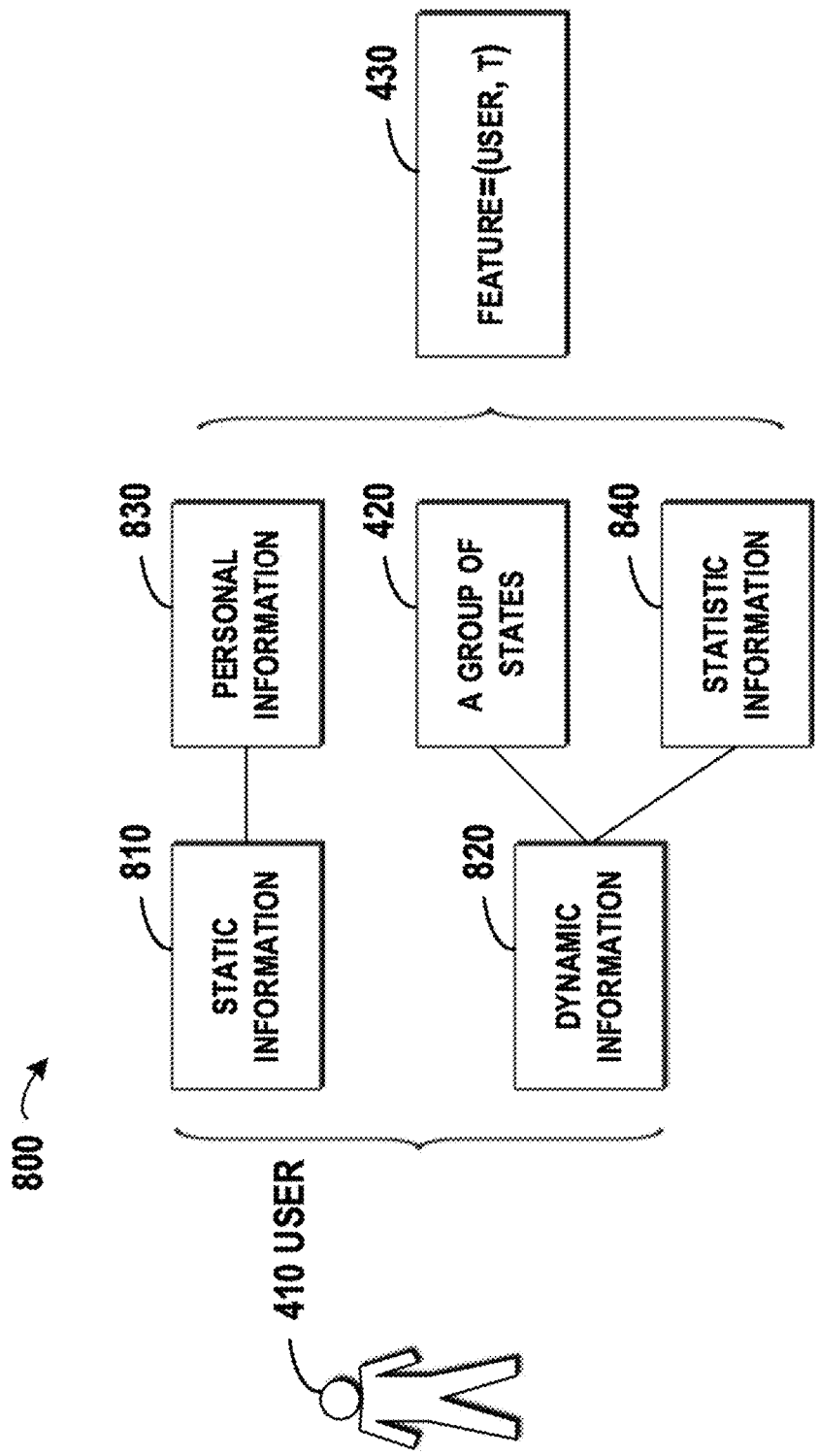
FIG. 8 depicts a block diagram of a procedure for generating a feature of the user, according to an embodiment of the present invention.

Embodiments regarding generating feature 430 being based on the group of states 420 are disclosed herein. According to an embodiment of the present invention, other information may also be considered in feature generation. Reference will be made to FIG. 8 for generating the feature 430 based on more information. FIG. 8 depicts a block diagram 800 of a procedure for generating a feature of the user according to at least one embodiment of the present invention. In FIG. 8, static information 810 and dynamic information 820 may be collected from the user 410. In embodiments the static information 810 may include user opted-in personal information 830, such as a telephone number. This personal information may affect the analysis of the user's behavior in some circumstances. In an example where a first telephone number falls into a first number segment and a second telephone number falls into a second number segment, the first number segment could have been put into use ten years before the second number segment was used. As a result, the user of the first telephone number could have a longer history of using his/her telephone than the user of the second phone number. By considering the personal information in the feature generation, more related aspects of the user 410 may be utilized for further determining the current privilege.

In embodiments, the dynamic information 820 may also include statistical information 840 about the account of the user 410 as well as the group of states 420. In these embodiments, the statistical information 840 may include an average of the account balance per month within a specified time duration, an average of the bills per month, similar account information, or a combination thereof. In these embodiments, the statistical information 840 may also show the user's monthly consumption habits and can provide more information regarding the user's behavior. In some embodiments, the feature 430 may be determined based on both of the static information 810 and the dynamic information 820.

In embodiments, the personal information 830, the group of states 420, and the statistical information 840 may be used together for determining the feature 430. The feature 430 may include two other dimensions, (i.e., "personal information" and "statistical information"). These two dimensions can be determined based on personal information 830 and the statistical information 840. One example could include comparing first user, who has a telephone number of a short history and a low account balance, to a second user, who has a telephone number of a long history and a high account balance. Continuing this example, the second user may be determined as a relatively reliable user and his/her current privilege may be determined higher than those of the first user.

The preceding paragraphs have described procedures for generating the feature 430. In embodiments, feature 430 may be utilized to manage the privilege for the user 410. Referring back to FIGS. 4-5, at block 530 the privilege 440 of the user 410 at a current time in the application system may be managed based on the feature 430. In embodiments, the machine learning technology may be adopted to generate a map characterizing the association between features and privileges for reference users in the application system (see FIG. 9 for further description).

Figure 9:
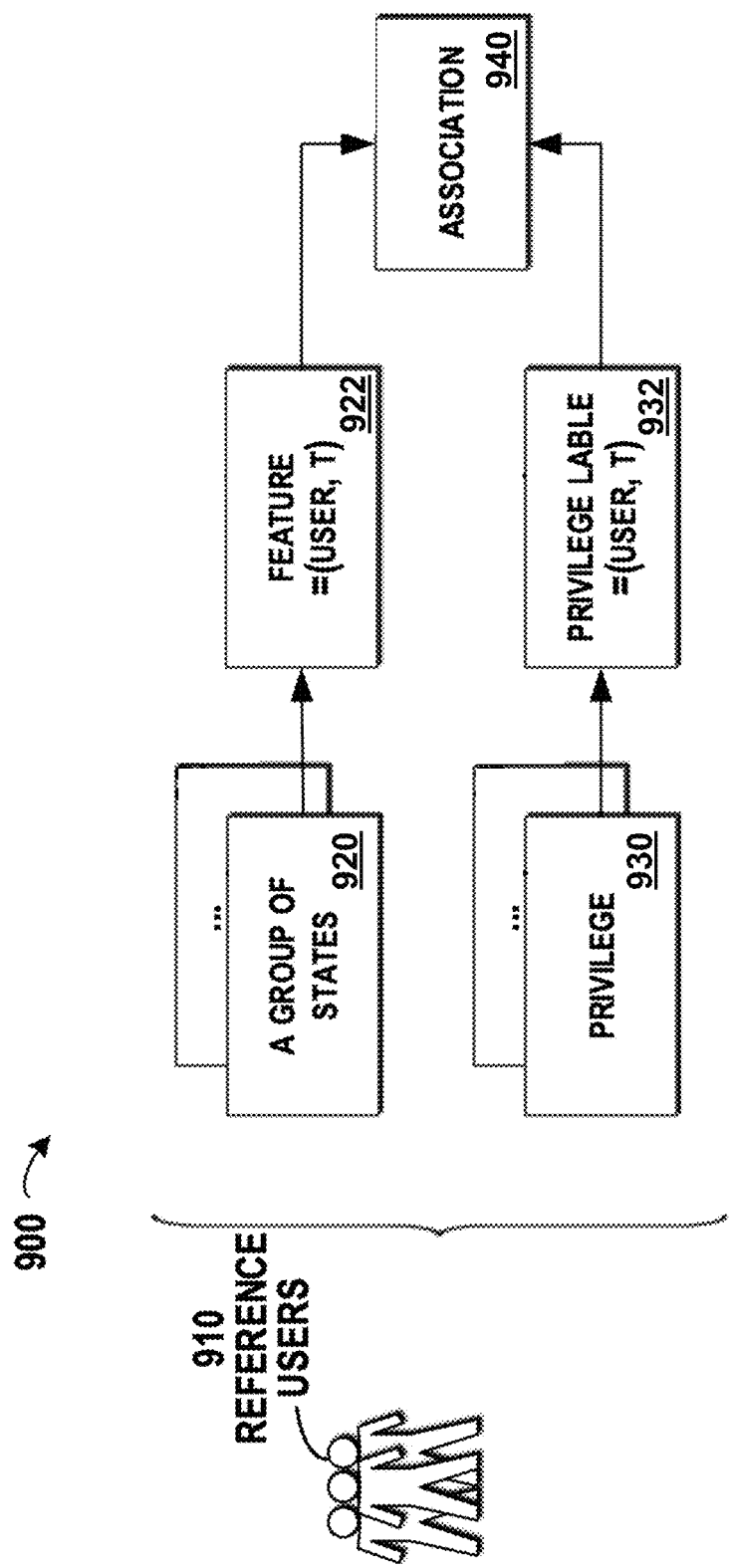
FIG. 9 depicts a block diagram of a procedure for obtaining an association between features and privileges, according to an embodiment of the present invention.

FIG. 9 depicts a block diagram 900 of a procedure for obtaining an association 940 between features and privileges, in accordance with at least one embodiment of the invention. In embodiments, a sample dataset may be collected from a group of reference users 910. In these embodiments, the sample dataset may include multiple samples associated with a historical time period, and each sample may be related to one of the reference users 910. The sample data may include a group of states 920 and a privilege 930 of the reference user. The group of states 920 may be processed in a similar manner as described above to obtain a feature 922. Particular examples of this have been left out for brevity.

Figure 10:
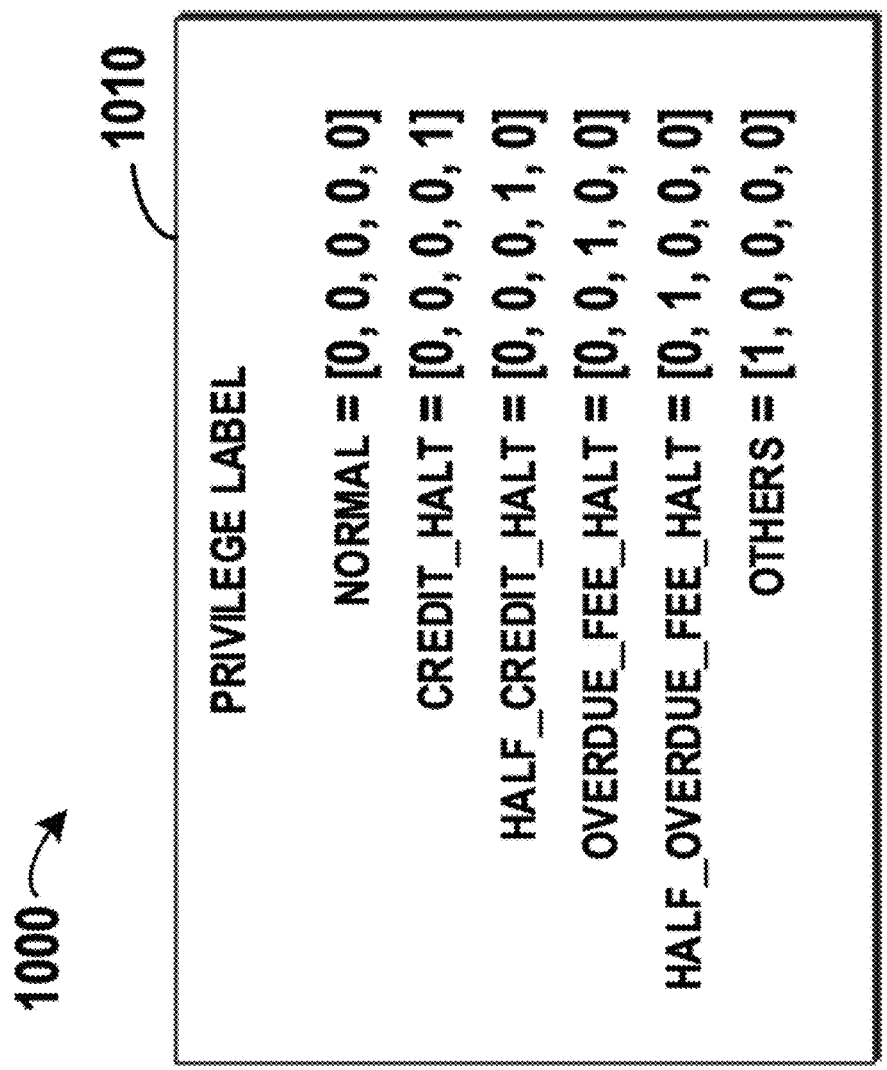
FIG. 10 is a block diagram depicting an example data structure of a privilege label, in accordance with at least one embodiment of the present invention.

In embodiments, privileges for reference users in the application system may be collected. In these embodiments, in order to identify the privileges of the reference users 910, a privilege label 932 may be determined for the privilege 930. Privilege labels are discussed in more detail in reference to FIG. 10. More particularly, FIG. 10 depicts a block diagram 1000 of a data structure illustrating a privilege label according to at least one embodiment of the invention. In embodiments, privilege label 1010 may be represented by a vector, where the normal type may be represented by [0, 0, 0, 0, 0], the CREDIT_HALT type 610 may be represented by [0, 0, 0, 0, 1], the HALF_CREDIT_HALT type 620 may be represented by [0, 0, 0, 1, 0], the OVERDUE_HALT type 630 may be represented by [0, 0, 1, 0, 0], the HALF_OVERDUE_HALT type 630 may be represented by [0, 1, 0, 0, 0]. In these embodiments, a vector [1, 0, 0, 0, 0] may be reserved for other types.

As described herein, various privileges may correspond to accessing various resources in the application system. In embodiments, the administrators of the application system (e.g., telecommunication system), may perform a mapping of the privilege and resources that are allowed to be accessed by the user. In some embodiments, a privilege labeled as NORMAL may represent that the user can access all resources in the application system (e.g., telecommunication system), a privilege labeled as CREDIT_HALT type 610 may represent that the user cannot access any resources in the application system, and a privilege labeled as HALF_CREDIT_HALT type 620 may represent that the user can only answer phone calls and receive messages.

In some embodiments, the privilege 930 may be encoded into a corresponding vector and then the association 940 may be generated by a training procedure. In these embodiments, the association 940 can be trained in such a way that a privilege estimation obtained from the trained association and the feature 922 matches the privilege 930. For example, a cost function may be built for the association 940 and parameters in the cost function may be adjusted based on samples in the sample dataset. In these embodiments, the trained association 940 may reflect historical knowledge on mappings between features and privileges of the reference users 910. As a result, the association 940 may provide a reliable ground for determining the privilege 440 of the user 410 at the current time.

Embodiments disclosing training the association 940 are disclosed herein. It is to be understood that the above procedure is just an example embodiment and any method capable of determining how the association 940 may be trained can be used. Once the association 940 is trained, the feature 430 of the user 410 may be input into the association 940 to determine a current privilege for the current time. In these embodiments, the feature 430 and the association 940 may output a privilege estimation.

Figure 11:
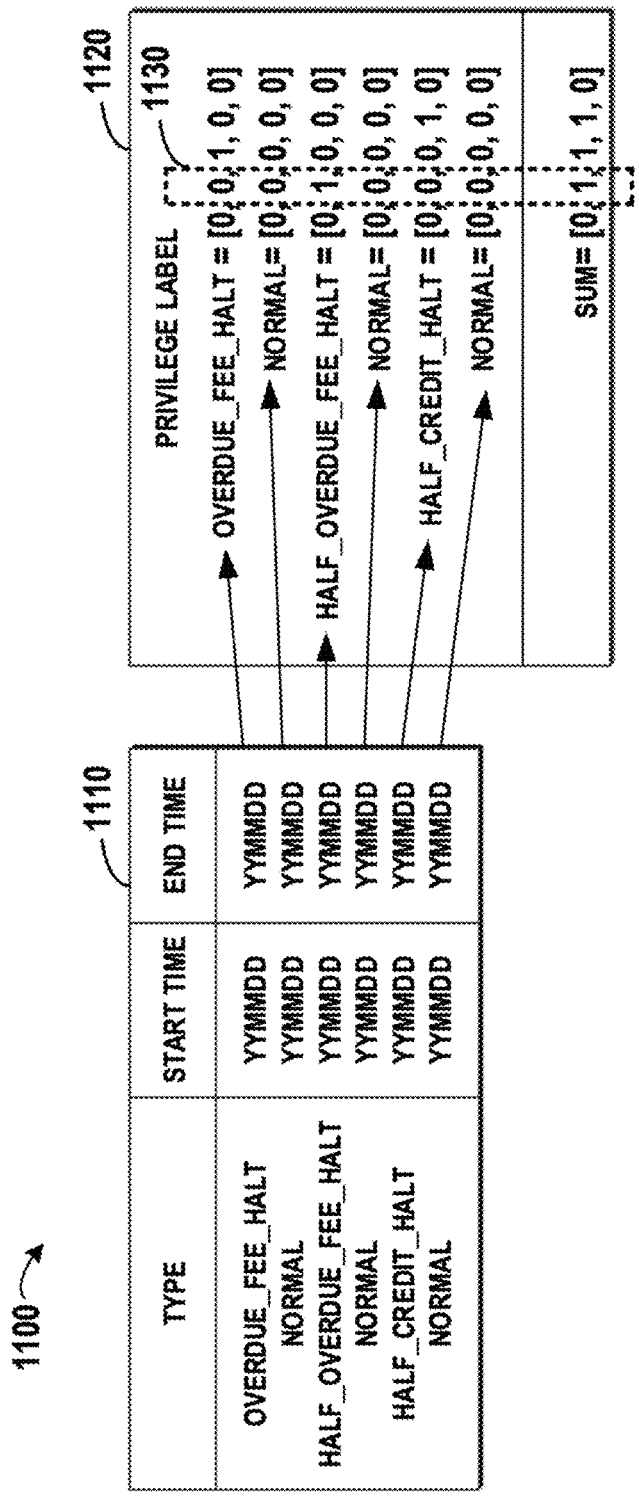
FIG. 11 is a block diagram depicting an embodiment for determining a privilege label from a group of states, in accordance with at least one embodiment of the present invention.

FIG. 11 depicts a block diagram of a procedure 1100 for determining a privilege label from a group of states in accordance with at least one embodiment of the invention. In FIG. 11, a table 1110 illustrates the group of states 420 of the user 410. In this example, six historical states from the start time to the end time are included. In these embodiments, the end time may be specified as the current time and the start time may be determined from the current time and the previous time period. For example, if the previous time period is determined as the last 12 months and the current time is June 2020, the start time may be set to June 2019. Continuing the example, table 1110 illustrates six historical states, among which three of them relate to normal types and three of them relate to abnormal types. In these embodiments, these states may be processed as described herein to determine a feature. Once a feature is determined, then the feature may be mapped to a corresponding privilege label according to the association 940.

In some embodiments, each of the states may be processed individually and an individual privilege label may be obtained from each state. As shown in a block 1120, the first state with the OVERDUE_HALT type 630 may be mapped to a vector [0, 0, 1, 0, 0], the second state with the NORMAL type may be mapped to a vector [0, 0, 0, 0, 0], the third state with the HALF_OVERDUE_HALT type 640 may be mapped to a vector [0, 1, 0, 0, 0], and so on. In addition, those privilege labels may be summed to determine a final label, where values in the same dimension are summed as show in a block 1130. Particularly, if any of the values in the same dimension include "1," the final value of this dimension is set to "1." Otherwise, if none of the values includes "1," the final value of this dimension is set to "0." At this point, the final label of the user 410 at the current time may be determined as [0, 1, 1, 1, 0]. In some embodiments the privilege estimation depends on feature 430 which, in turn, relates to multiple historical states of the user 410. In these embodiments, the privilege estimation may reflect a reliable situation of the user 410, such that errors in privilege management may be eliminated.

In these embodiments, the privilege estimation may correspond to a group of resources that are forbidden or inaccessible by the user. More particularly, the administrator of the telecommunication system (i.e., the application system) may define the forbidden resources for each privilege label. For example, the privilege label [0, 1, 1, 1, 0] may indicate that the user can use no communication service, but can only keep his/her phone number active until the balance reaches a certain amount. In another example, forbidden resources for the privilege label [0, 1, 1, 1, 0] may be determined based on forbidden resources related to each non-zero value in the label. As a result, the forbidden resources for [0, 1, 1, 1, 0] may be a sum of forbidden resources for the labels [0, 1, 0, 0, 0], [0, 0, 1, 0, 0], and [0, 0, 0, 1, 0].

In FIG. 11, table 1110 provides an example embodiment of the group of states of the user 410, and may include more or less states between the start time and the end time. In these embodiments, the previous time period may have various lengths. In one example, the table 1110 may include five normal states, and each of them may be mapped into a vector of [0, 0, 0, 0, 0]. Continuing with this example, the final privilege label may be set to [0, 0, 0, 0, 0], and the current privilege 440 of the user 410 may be determined as normal. In another example, table 1110 may include five normal states with an abnormal state having the OVERDUE_HALT type 630 occurring in June 2019. In this example, as the occurrence of the abnormal state is increasingly distant from the present/current time, it may play a decreasing impact on the privilege determination due to the attenuation function. As such, the impact of the abnormal state can be attenuated and/or removed when generating the feature 430. As a result of this, the current privilege 440 of the user 410 may also be determined as normal.

FIG. 11 provides an example for determining the privilege label of the user 410, but any method capable of determining the privilege label may be used. For example, the association 940 may be trained to reflect a mapping between features and final privilege labels for the reference users 910. In this example, the association 940 may then directly output a final privilege label for the user 410. In embodiments, various aspects of the historical states are considered for the user 410. As a result, the privilege 440 for the current time may be determined in a more reliable and effective manner for the user 410. Therefore, a temporary decline in a credit for a reputable user may be considered an exception where the user 410 can continue to have high privileges for accessing resources until his/her states identify him/her as a relatively unreliable user.

Although the above paragraphs describe embodiments of the present invention by taking the telecommunication system as an example application system, the application system may be configured to be any applicable system including, but not limited to, a financial system, a television system, a network storage system. In the embodiments disclosed herein, privileges of users in various application systems may be managed according to their historical states and thus they may be allocated with proper privileges for accessing recourses in the application system. Moreover, providers of the application systems may decide whether it is acceptable to provide services to a potential malicious user so as to prevent further loss.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for user behavior management, comprising:
    obtaining, by one or more processors, a group of states of a user of an application system within a previous time period, a state in the group of states being associated with a privilege of the user for accessing resources in the application system during the previous time period;
    generating, by one or more processors, a feature of the user based on the group of states;
    mapping, by one or more processors, the features and the privileges for reference users in the application system;
    obtaining, by one or more processors, an association characterizing the mapping of the features and the privileges; and
    managing, by one or more processors, the privilege of the user at a current time in the application system based on the feature, wherein managing the privilege of the user at the current time comprises:
        managing, by one or more processors, the privilege of the user at the current time based on a privilege estimation obtained from the feature of the user and the association.

2. The computer-implemented method of claim 1, wherein generating the feature of the user comprises:
    obtaining, by one or more processors, at least one attribute of the state in the group of states; and
    determining a dimension of the feature based on the at least one attribute and the group of states.

3. The computer-implemented method of claim 2, wherein the at least one attribute is selected from a group consisting of a count of states in the group of states, a time duration that a state in the group of states lasts, and a time difference between a latest occurrence of a state in the group of states and the current time.

4. The computer-implemented method of claim 2, wherein the group of states includes a group of abnormal types where the user is allowed to access a portion of the resources in the application system, and the abnormal types includes at least one of a credit abnormal type and an overdue abnormal type.

5. The computer-implemented method of claim 4, wherein determining the dimension of the feature comprises:
    generating, by one or more processors, a group of components in the dimension based on the group of abnormal types, respectively; and determining, by one or more processors, the dimension of the feature based on the group of components.

6. The computer-implemented method of claim 5, wherein determining the dimension comprises, with respect to a given abnormal type in the group of abnormal types:
  selecting, by one or more processors, from the group of states a portion of states having the given abnormal type; and
  generating, by one or more processors, a component in the group of components based on a comparison of the portion of states having the given abnormal type and the group of states.

7. The computer-implemented method of claim 1, wherein generating the feature of the user further comprises:
  obtaining, by one or more processors, an attenuation function associated with the state in the group of states, the attenuation function representing an impact degree that the state impacts the privilege of the user at the current time based on a time difference between an occurrence of the state and the current time; and
  generating, by one or more processors, the feature of the user based on the attenuation function and the group of states.

8. The computer-implemented method of claim 1, wherein obtaining the association further comprises:
  determining, by one or more processors, the features for the reference users based on a historical state of the reference users;
  collecting, by one or more processors, the privileges for the reference users in the application system; and
  training, by one or more processors, the association such that the privilege estimation obtained from the trained association and a feature for the reference user matches a privilege for the reference user.

9. The computer-implemented method of claim 1, further comprising:
  obtaining, by one or more processors, static information of the user and statistical information for an account of the user; and
  generating, by one or more processors, the feature further based on the static information and the group of states.

10. A computer system for user behavior management, the computer system comprising:
  one or more computer processors;
  one or more non-transitory computer readable storage media;
  computer program instructions;
  the computer program instructions being stored on the one or more computer readable storage media for execution by the one or more computer processors; and
  the computer program instructions including instructions to:
    obtaining a group of states of a user of an application system within a previous time period, a state in the group of states being associated with a privilege of the user for accessing resources in the application system during the previous time period;
    generating a feature of the user based on the group of states;
    mapping the features and the privileges for reference users in the application system;
    obtaining an association characterizing the mapping of the features and the privileges; and
    managing the privilege of the user at the current time in the application system based on the feature, wherein managing the privilege of the user at the current time comprises:
      managing the privilege of the user at the current time based on a privilege estimation obtained from the feature of the user and the association.

11. The computer system of claim 10, wherein generating the feature of the user comprises:
  obtaining at least one attribute of the state in the group of states; and
  determining a dimension of the feature based on the at least one attribute and the group of states.

12. The computer system of claim 11, wherein the at least one attribute is selected from a group consisting of a count of states in the group of states, a time duration that a state in the group of states lasts, and a time difference between a latest occurrence of a state in the group of states and the current time.

13. The computer system of claim 11, wherein the group of states includes a group of abnormal types where the user is allowed to access a portion of the resources in the application system, and the group of abnormal types include a credit abnormal type and an overdue abnormal type.

14. The computer system of claim 13, wherein determining the dimension of the feature comprises:
  generating a group of components in the dimension based on the group of abnormal types, respectively; and
  determining the dimension of the feature based on the group of components.

15. The computer system of claim 12, wherein generating the feature of the user further comprises:
  obtaining an attenuation function associated with the state in the group of states, the attenuation function representing an impact degree that the state impacts the privilege of the user at the current time based on a time difference between an occurrence of the state and the current time; and
  generating the feature of the user based on the attenuation function and the group of states.

16. A computer program product for user behavior management, the computer program product comprising one or more non-transitory computer readable storage media and program instructions stored on the one or more computer readable storage media, the program instructions including instructions to:
  obtain a group of states of a user of an application system within a previous time period, a state in the group of states being associated with a privilege of the user to access resources in the application system during the previous time period;
  generate a feature of the user based on the group of states;
  map the features and the privileges for reference users in the application system;
  obtain an association characterizing the mapping of the features and the privileges; and
  manage, by one or more processors, the privilege of the user at a current time in the application system based on the feature, wherein managing the privilege of the user at the current time comprises:
    managing the privilege of the user at the current time based on a privilege estimation obtained from the feature of the user and the association.

17. The computer program product of claim 16, wherein generating the feature of the user comprises:
  obtain at least one attribute of the state in the group of states; and
  determine a dimension of the feature based on the at least one attribute and the group of states.

18. The computer program product of claim 16, wherein the group of states comprise a group of abnormal types where the user is allowed to access a portion of the resources in the application system, and the abnormal types comprise any of a credit abnormal type and an overdue abnormal type.

* * * * *